United States Patent
Ono

(10) Patent No.: US 7,366,329 B2
(45) Date of Patent: Apr. 29, 2008

(54) AUTHENTICATION APPARATUS

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 821 days.

(21) Appl. No.: 10/749,406

(22) Filed: Jan. 2, 2004

(65) Prior Publication Data

US 2004/0151348 A1    Aug. 5, 2004

(30) Foreign Application Priority Data

Feb. 5, 2003    (JP) ............................. 2003-028180
Nov. 13, 2003    (JP) ............................. 2003-384258

(51) Int. Cl.
*G06K 9/00*    (2006.01)

(52) U.S. Cl. ....................... 382/116; 382/115

(58) Field of Classification Search ................ 382/115, 382/116, 118, 170, 171, 123; 348/143, 115; 340/5.83, 5.53; 902/3, 4, 5, 6, 25; 235/380, 235/382, 382.5

See application file for complete search history.

(56) References Cited

U.S. PATENT DOCUMENTS 5,761,329 A * 6/1998 Chen et al. ................. 382/116
7,120,278 B2 * 10/2006 Sukegawa et al. .......... 382/118
7,130,454 B1 * 10/2006 Berube et al. .............. 382/118

FOREIGN PATENT DOCUMENTS

JP    2001-326841 A    11/2001
JP    2002-092495 A    3/2002

* cited by examiner

*Primary Examiner*—Samir Ahmed
*Assistant Examiner*—Mehdi Rashidian
(74) *Attorney, Agent, or Firm*—Birch, Stewart, Kolasch & Birch, LLP

(57) ABSTRACT

The invention matches a countenance of a user during authentication to a countenance of the user's head shot held in advance. An authentication apparatus for certifying the user using a picture registered in memory, includes an image pickup unit taking the picture of the user, and an authentication unit certifying the user by letting the user bring into a predetermined action and comparing the user's picture taken by the image pickup unit when the user brings into the predetermined action and the picture registered in memory. In addition, the image pickup unit takes an animated image of the user, memory supplies an animated image of the user who brings into the predetermined action to the authentication unit, and the authentication unit certifies the user by comparing the user's movement in the animated image taken by the image pickup unit and the user's movement in the animated image acquired from memory.

11 Claims, 7 Drawing Sheets

AUTHENTICATION APPARATUS

This patent application claims priorities from Japanese patent applications No. 2003-028180 filed on Feb. 5, 2003 and No. 2003-384258 filed on Nov. 13, 2003, the contents of which are incorporated herein by reference.

BACKGROUND OF THE INVENTION

1. Field of the Invention

The present invention relates to an authentication apparatus. More particularly, the present invention relates to the authentication apparatus for improving user's authentication precision.

2. Description of the Related Art

In order to manage entrance management or secret information, an authentication process may be performed for a user. The user's authentication process includes a method of using portable recording media holding an authentication key and a method of using a head shot and/or a fingerprint etc. For details, refer to, for example, Japanese Patent Laid-Open No. 2002-92495 and Japanese Patent Laid-Open No. 2001-326841.

When the user performs the personal authentication using the head shot, it is preferable to accord a countenance of the user during the authentication process with a countenance of a head shot of the user held in advance in order to certify the user with higher precision.

SUMMARY OF THE INVENTION

Therefore, it is an object of the present invention to provide an authentication apparatus which can solve the foregoing problem. The above and other objects can be achieved by combinations described in the independent claims. The dependent claims define further advantageous and exemplary combinations of the present invention.

According to the first aspect of the present invention, there is provided an authentication apparatus for certifying a user using a picture registered in a memory. The authentication apparatus comprises: an image pickup unit for taking the picture of the user; and an authentication unit for certifying the user by letting the user to bring into a predetermined action and comparing the user's picture taken by the image pickup unit when the user brings into the predetermined action and the picture registered in the memory.

In the authentication apparatus, the image pickup unit may take an animated image of the user, the memory may supply an animated image of the user who brings into the predetermined action to the authentication unit, the authentication unit may certify the user by comparing the user's movement in the animated image taken by the image pickup unit and the user's movement in the animated image acquired from the memory.

In the authentication apparatus, the image pickup unit may take an animated image of head shots of the user, the memory may supply an animated image of head shots of the user to the authentication unit, the authentication unit may certify the user by comparing a movement of the head shots taken by the image pickup unit and a movement of the head shots acquired from the memory.

The authentication apparatus may further comprise a registration information acquiring unit for acquiring a voice of the user and the head shot of the user corresponding to the voice from the memory, and the image pickup unit may take the head shots of the user, the authentication unit may certify the user by comparing the head shots of the user taken by the image pickup unit and the head shots acquired from the memory when a degree of coincidence between a voice newly uttered by the user and the voice acquired from the memory satisfies a predetermined reference.

In the authentication apparatus, the memory may hold the animated image of the head shots when the user has uttered the voice, the image pickup unit may take the head shots of the user as the animated image when the voice has been uttered, the authentication unit may certify the user by comparing the animated image acquired from the memory and the animated image taken by the image pickup unit.

The authentication apparatus may further comprise a microphone for newly acquiring the voice that the user utters, and the authentication unit may certify the user by respectively selecting frame pictures at the time that the user utters the same voice out of the animated image acquired from the memory and the animated image taken by the image pickup unit using the voice acquired from the memory and the voice acquired by the microphone, and comparing the selected frame pictures.

In the authentication apparatus, the authentication unit may certify the user by selecting a plurality of combinations of the frame pictures at the time that the user utters the same voice out of the animated image acquired from the memory and the animated image taken by the image pickup unit, and comparing the selected plurality of combinations of the frame pictures respectively.

In the authentication apparatus, the authentication unit may include a synchronization unit for synchronizing each frame picture of the animated image acquired from the memory with the respective frame pictures at the time that the user utters the same voice in the animated image taken by the image pickup unit using the voice acquired from the memory and the voice acquired by the microphone, and certify the user by comparing the synchronized frame pictures.

In the authentication apparatus, the authentication unit may certify the user by selecting a plurality of frame pictures at the time that the user utters the same voice out of each of the animated image acquired from the memory and the animated image taken by the image pickup unit, comparing a difference between the plurality of frame pictures selected out of the animated images acquired from the memory and a difference between the plurality of frame pictures selected out of the animated images taken by the image pickup unit, and comparing the movements of the user's face.

In the authentication apparatus, the authentication unit may certify the user by respectively cutting a mouth of the user from the plurality of frame pictures, calculating and comparing the plurality of the differences of the cut user's mouth, and comparing a movement of the user's mouth in the animated image acquired from the memory and a movement of the user's mouth in the animated images taken by the image pickup unit.

In the authentication apparatus, the memory may store head shots at the time that the user does not utter the voice, the image pickup unit may take the head shots at the time that the user does not utter the voice, the authentication unit may certify the user by comparing the head shots acquired from the memory and the head shots taken by the image pickup unit at the time that the user does not utter the voice.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
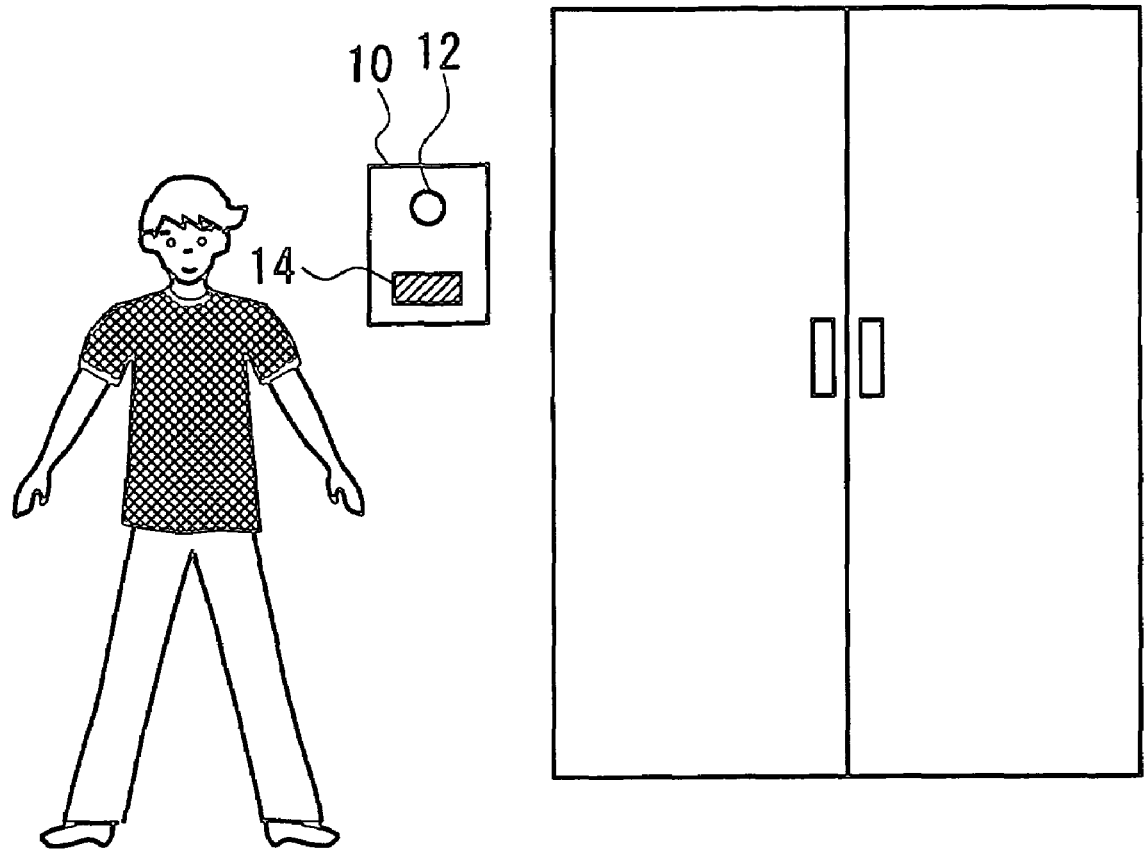
FIG. 1 is a view showing a use example of an authentication apparatus according to an embodiment of the present invention.

FIG. 1 is a view showing a use example of an authentication apparatus 10 according to an embodiment of the present invention. The authentication apparatus 10 certifies a user based upon a head shot of the user when the user utters his password, and for example, is established at an entrance of a room. The authentication apparatus 10 allows the user to enter the room when the user has been certified.

The authentication apparatus 10 is equipped with an image pickup unit 12 and a microphone 14. The image pickup unit 12 takes animated images of the user's head shots. In addition, the microphone 14 newly acquires voices uttered by the user. Thereby, the authentication apparatus 10 takes the head shots of the user who hopes to enter the room as the animated image using the image pickup unit 12. In addition, the authentication apparatus 10 acquires the voices uttered by the user using the microphone 14. Then, the authentication apparatus 10 selects a frame picture taken at the time that the user has uttered the password from among the animated images taken by the image pickup unit 12.

Moreover, the authentication apparatus 10 holds the user's head shot when the user has uttered the password. Then, the authentication apparatus 10 calculates a degree of coincidence by comparing the selected frame picture and the pre-held user's head shot, and certifies the user.

For this reason, the authentication apparatus 10 can select the frame picture, the countenance of which is identical with the countenance of the user's head shot held in advance, from among the taken animated images, and use the frame picture for authentication. Therefore, the authentication precision of the authentication apparatus 10 is improved.

Figure 2:
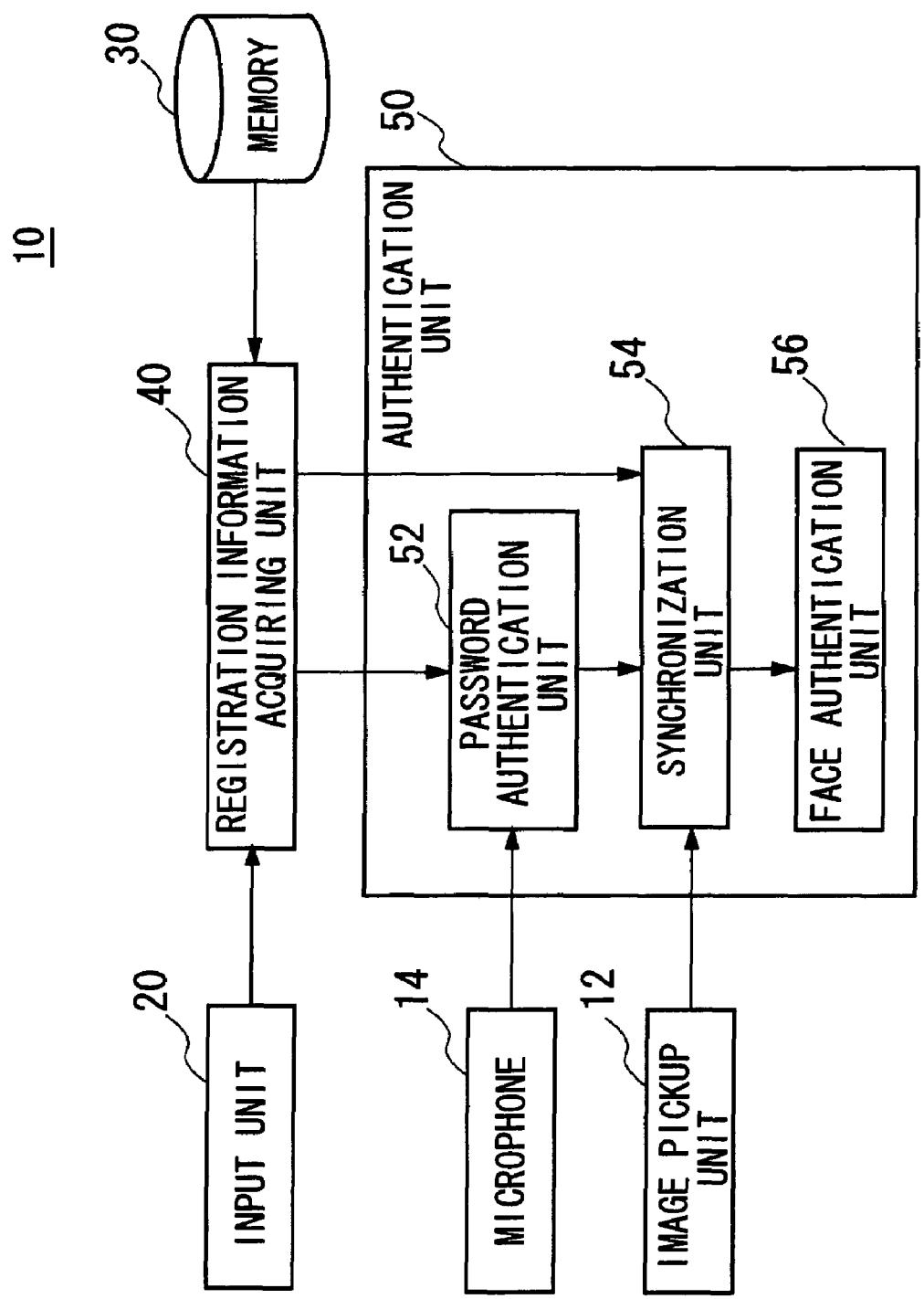
FIG. 2 is a block diagram showing a configuration of the authentication apparatus.

FIG. 2 is a block diagram showing a configuration of the authentication apparatus 10. The authentication apparatus 10 comprises the image pickup unit 12, the microphone 14, an input unit 20, a memory 30, a registration information acquiring unit 40, and an authentication unit 50, and certifies the users using the pictures registered in the memory 30. The authentication unit 50 comprises a password authentication unit 52, a synchronization unit 54, and a face authentication unit 56.

The input unit 20 includes, for example, a touch panel, and acquires identification information of the user such as a user ID. The memory 30 holds each user's password and the voices and animated images of the users when the users have uttered the passwords in response to each of the plurality of users' identification information. The registration information acquiring unit 40 selects and acquires the password, voice and head shot from the memory 30 based upon the user's identification information acquired by the input unit 20. The password authentication unit 52 decides whether or not the user has uttered the password. The synchronization unit 54 synchronizes the animated image generated by the image pickup unit 12 with the animated image acquired by the registration information acquiring unit 40, and respectively selects the frame picture which should be use for authentication out of the two animated images. The face authentication unit 56 calculates the degrees of coincidence of the selected frame pictures, and certifies the user.

Furthermore, the details of process of each unit will be explained below using flowcharts.

Figure 3:
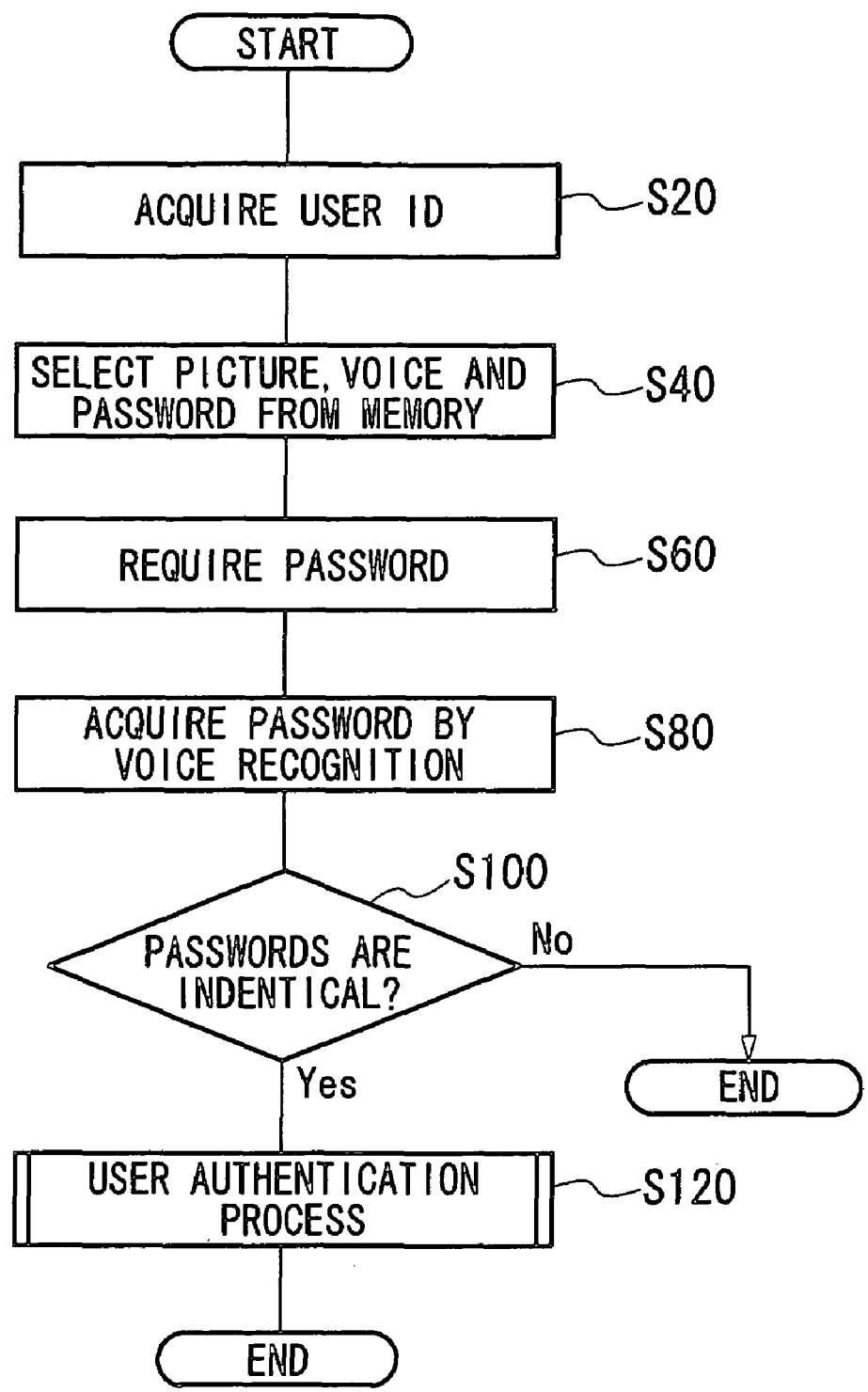
FIG. 3 is a flowchart showing an authentication process performed by the authentication apparatus.

FIG. 3 is a flowchart showing an authentication process performed by the authentication apparatus 10. The input unit 20 acquires a user's identification information from the user (S20). The registration information acquiring unit 40 selects the password, voice and head shot which should be utilized for authentication based upon the user's identification information acquired from the user (S40). The authentication unit 50 requests the user to utter the password (S60). Thereby, the authentication unit 50 lets the user to bring into a predetermined action that the user speaks the password. The microphone 14 acquires the password that the user has uttered. Then, the password authentication unit 52 decides a word spoken by the user using voice recognition technique (S80), and decides whether or not the decided word is identical with the password acquired from the memory 30 (S100). If it is identical, the synchronization unit 54 and the face authentication unit 56 perform a face authentication process (S120).

As mentioned above, the authentication apparatus 10 certifies the user by performing the face authentication only when the user has spoken the registered password. In this case, the image pickup unit 12 can take the user's head shot with the same countenance as that of the head shot stored in the memory 30, because the user brings into the predetermined action. For this reason, the authentication precision for the user is increased.

In addition, the authentication unit 50 may let the user to bring into not only the action that the user speaks the password but other actions determined in advance. For example, the authentication unit 50 may let the user to bring into the predetermined actions such that the user blinks his eyes or puts out his tongue. In this case, the authentication unit 50 may let the user to bring into the predetermined actions, for example, by giving an impetus that induces an action. For example, the authentication unit 50 may let the user to blink his eyes by shining a flashlight on the user's face.

Moreover, in this case, the animated images that the user brings into the predetermined actions are registered in the memory 30. Then, in step S20, the memory 30 provides the user's animated image of bringing into the predetermined action to the authentication unit 50. For example, the memory 30 provides the animated image of the user's head shots that the user speaks the password to the authentication unit 50 according to the identification information received by the input unit 20.

The authentication unit 50 certifies the user by comparing the user's animated image taken by the image pickup unit 12 during the predetermined action by the user and the animated image registered in the memory 30. In this case, the authentication unit 50 may certify the user by comparing both traces of actions for each part of the face or the body in both animated images. Thereby, the user can be certified with high precision.

Figure 4:
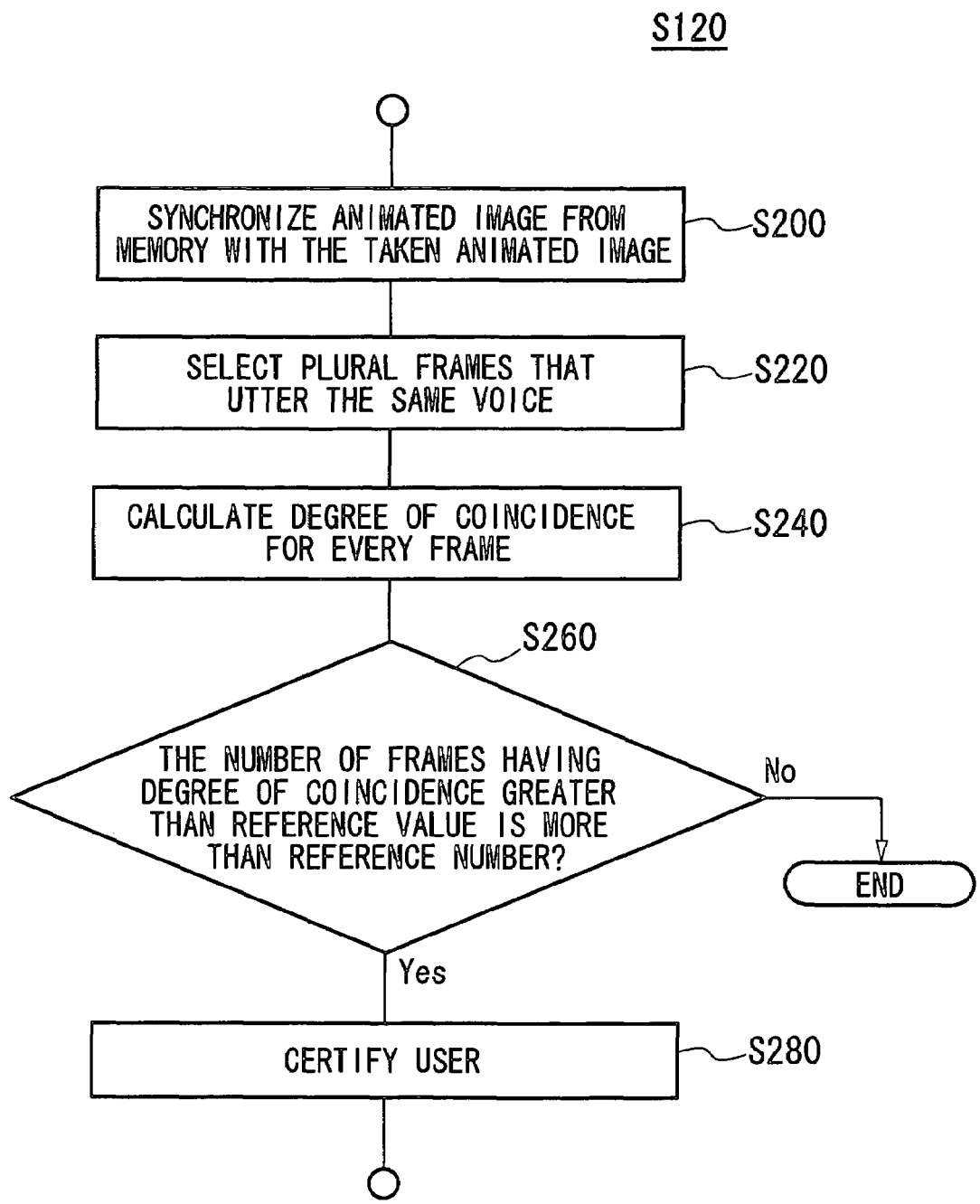
FIG. 4 is a flowchart showing the process of S120 shown in FIG. 3.

FIG. 4 is a flowchart showing the process of S120 shown in FIG. 3. The synchronization unit 54 synchronizes the animated image taken by the image pickup unit 12 with the animated image acquired from the memory 30 based upon the user's voices at the time that the user has uttered the password (S200). For example, the synchronization unit 54 synchronizes the two animated images by confronting a plurality of frame pictures of the animated image taken by the image pickup unit 12 with the frame pictures at the time that the same voices are uttered out of the animated image acquired from the memory 30 respectively.

The synchronization unit 54 selects the frame pictures corresponding to each other, that is, the plurality of the frame pictures at the time that the same voices are uttered for each of the two synchronized animated images (S220).

The face authentication unit 56 calculates the degrees of coincidence between the head shots taken by the image pickup unit 12 and the head shots acquired from the memory 30 for each of the selected frames (S240). Then, the face authentication unit 56 decides for every frame whether or not the calculated degrees of coincidence are more than the predetermined reference value. When the number of frames having the degrees of coincidence greater than the reference value is more than the predetermined reference number (S260: Yes), the face authentication unit certifies the user (S280).

According to this flowchart, even if the degree of coincidence in the specified frame picture is extremely low, for example, by having a countenance other than usual countenance when the user utters the password, the authentication apparatus 10 can certify the user in case that the degree of coincidence for the other frame picture is high.

Furthermore, the synchronization unit 54 may accord both playback times when the user utters the password by expanding and contracting play back time of either side out of the animated image taken by the image pickup unit 12 and the animated image acquired from the memory 30, in step S200. In this case, the synchronization unit 54, for example, conforms frame rates of both the animated images by thinning out or interpolating the frames of either animated image.

Moreover, the face authentication unit 56 may certify the user when an average of the plurality of the calculated degrees of coincidence is greater than the predetermined reference value, in S260 and S280. At this time, the face authentication unit 56 may also calculate the average using several higher degrees of coincidence, rather than calculate the average using all the degrees of coincidence.

Figure 5:
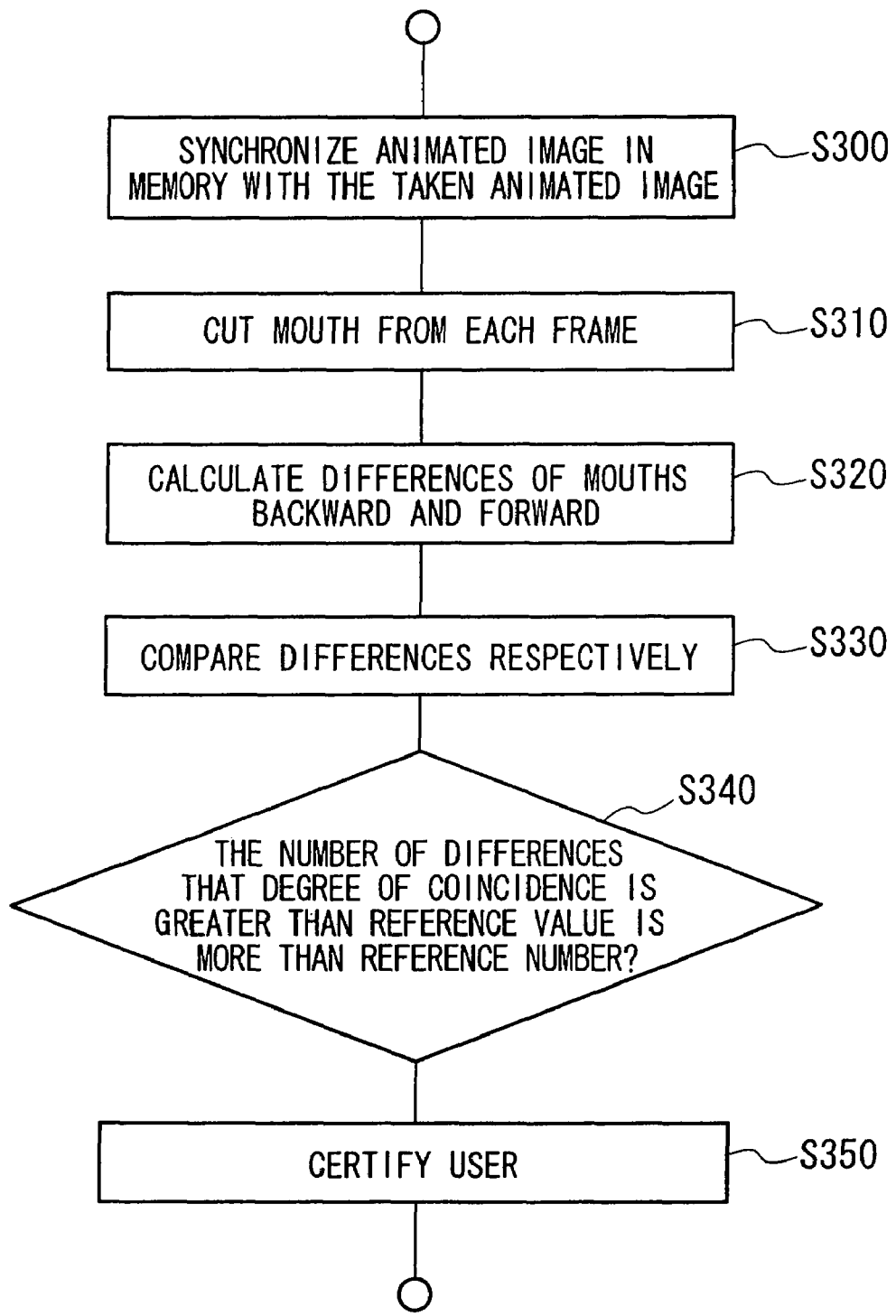
FIG. 5 is a flowchart showing the first transformation example of the process of S120 shown in FIG. 3.

FIG. 5 is a flowchart showing the first transformation example of the process of S120 shown in FIG. 3. In this example, the face authentication unit 56 certifies the user based upon a user's mouthing when the user utters the password.

The synchronization unit 54 synchronizes the animated image taken by the image pickup unit 12 with the animated image acquired from the memory 30 based upon a user's voice when the user utters the password (S300). Explanation of this process will be omitted because the process is identical with that of S200 in FIG. 4.

Next, the face authentication unit 56 cuts mouths from the frame pictures of the animated image taken by the image pickup unit 12 and the frame pictures of the animated image acquired from the memory 30 (S310). The face authentication unit 56 calculates the difference between the mouths' appearances for the frame pictures backward and forward in each of the animated image taken by the image pickup unit 12 and the animated image acquired from the memory 30 (S320). Then, the face authentication unit 56 calculates degrees of coincidence of the differences for the animated image taken by the image pickup unit 12 and the differences for the animated image acquired from the memory 30 (S330).

In addition, the difference for the mouth's appearance is, for example, the difference for the frame pictures backward and forward corresponding to the distance between a plurality of distinguishing marks obtained from the mouth's appearances. The face authentication unit 56 calculates, for example, the difference for the distance between both left and right ends on a lip. The face authentication unit 56 calculates variation of the distances for the frame pictures backward and forward as this difference. The face authentication unit 56 may also calculate the difference for the upward and downward width on the lip.

Furthermore, the face authentication unit 56 may also calculate the difference of the mouth's appearances for an interval between an utterance of the predetermined reference voice by the user and an utterance of the other predetermined reference voice. For example, the face authentication unit 56 may calculate the difference of the mouth's appearances for an interval from when the user utters a first voice of the password to when the user utters next voice or final voice of the password.

The face authentication unit 56 decides every difference whether or not the calculated degree of coincidence is greater than the predetermined reference value (S340). If the number of the differences greater than the reference value is more than the predetermined reference number (S340: Yes), the face authentication unit certifies the user (S350).

Here, the mouth is a part moving most severely in the user's face when he speaks a word. This movement is different from every person. Therefore, when someone else behaves like the user, the degree of coincidence of the mouth's movement is decreased in comparison with the case that the degree of coincidence of the overall face is calculated. Accordingly, the authentication apparatus 10 can certify the user with high precision. In addition, the face authentication unit 56 may also calculate a trace of the specified part of the mouth, and certify the user based upon the degree of coincidence of this trace.

As explained above, in this transformation example, the authentication unit 50 certifies the user by comparing the user's movement in the animated image taken by the image pickup unit 12 and the user's movement in the animated image acquired from the memory 30. In addition, the authentication unit 50 may also certify the user by comparing the movement of the head shots taken by the image pickup unit 12 and the movement of the head shots acquired from the memory 30, not the movement of the mouth. For example, the authentication unit 50 may also certify the user by comparing the movements of each part of the face in the animated images for both side's head shots. Furthermore, the authentication unit 50 may also certify the user by comparing, for example, variations of the head shots such as variation of the intervals between both eyes or variation of the lengths of nose's lower part.

Figure 6:
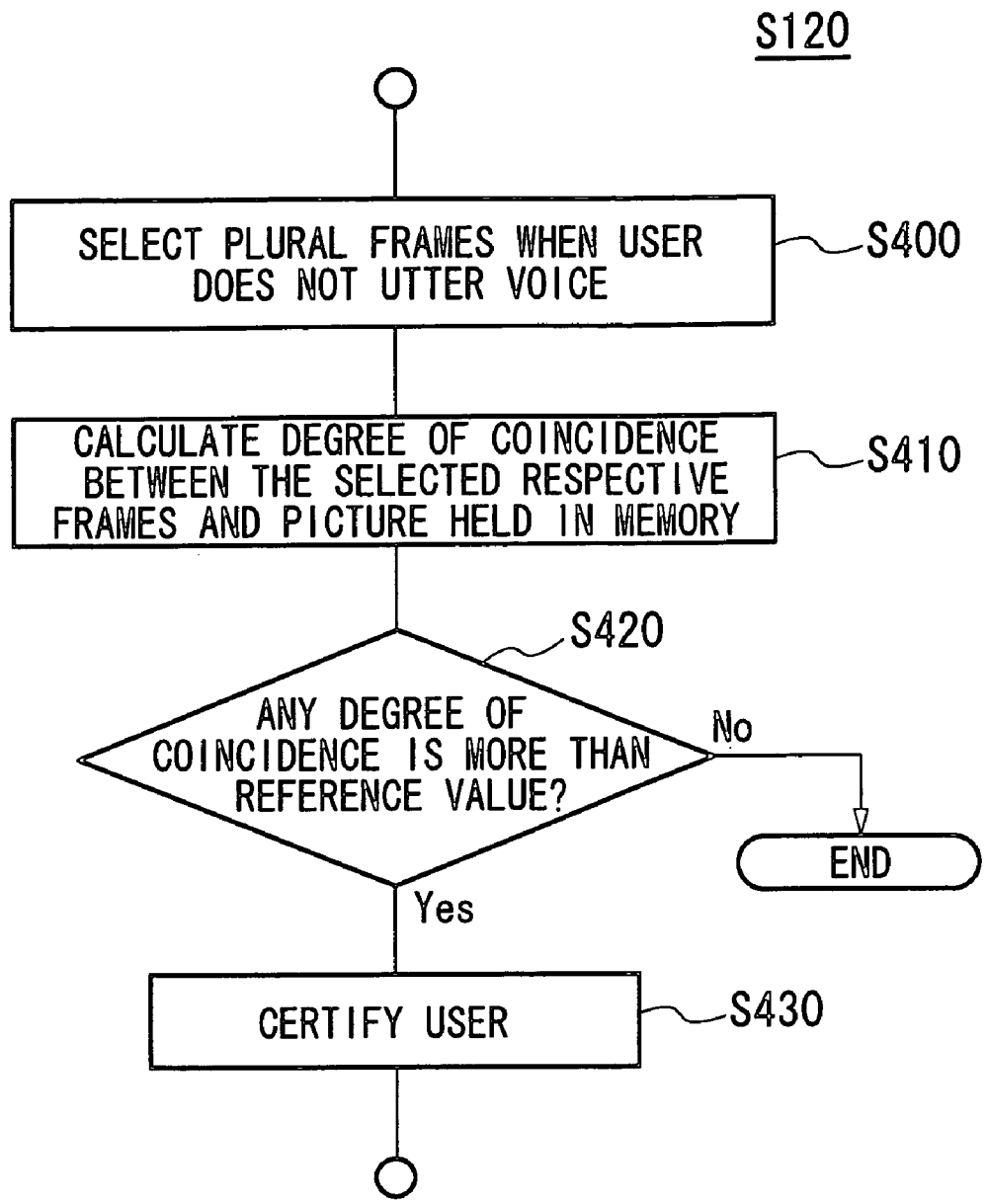
FIG. 6 is a flowchart showing the second transformation example of the process of S120 shown in FIG. 3.

FIG. 6 is a flowchart showing the second transformation example of the process of S120 shown in FIG. 3. In this example, the face authentication unit 56 certifies the user based upon the head shot at the time that the user does not make a voice. In addition, when performing the process shown in FIG. 6 in S120, the authentication apparatus 10 may not also include the synchronization unit 54. Moreover, the memory 30 may hold still pictures at the time that the user does not make a voice in response to the user's identification information.

The face authentication unit 56 selects a plurality of frame pictures at the time that the user does not make a voice from among the animated images taken by the image pickup unit 12 based upon the voices acquired by the microphone 14 (S400). Then, the face authentication unit 56 calculates the degrees of coincidence between each of the selected frame pictures and the still picture of the face held by the memory 30 (S410). When any degree of coincidence is more than the predetermined reference value (S420: Yes), the face authentication unit 56 certifies the user (S430).

As mentioned above, in this transformation example, the memory 30 holds the still pictures of the faces at the time that the users do not make voices. In addition, the face authentication unit 56 selects the frame pictures at the time that the users do not make voices from among the animated images taken by the image pickup unit 12. For this reason, the possibility that the user's countenance in the head shot held by the memory 30 accords with the user's countenance in the frame picture selected out of the taken animated images becomes high. Therefore, if the authentication process is performed by this transformation example, the user can be certified with high precision.

Furthermore, in S420 and S430, the face authentication unit 56 may certify the user when the number of the frames having the degree of coincidence greater than the predetermined reference value is more than the predetermined reference number. Moreover, the face authentication unit 56 may certify the user when the average of the calculated degrees of coincidence is greater than the predetermined reference value.

Furthermore, in this transformation example, the authentication unit 50 detects the status that the user does not make a voice using the user's voice detected by the microphone 14. Then, the authentication unit 50 certifies the user based upon the head shot at the time that the user does not make a voice. In this case, the authentication unit 50 directs the user to make a posture that the user does not make a voice as the predetermined posture.

Figure 7:
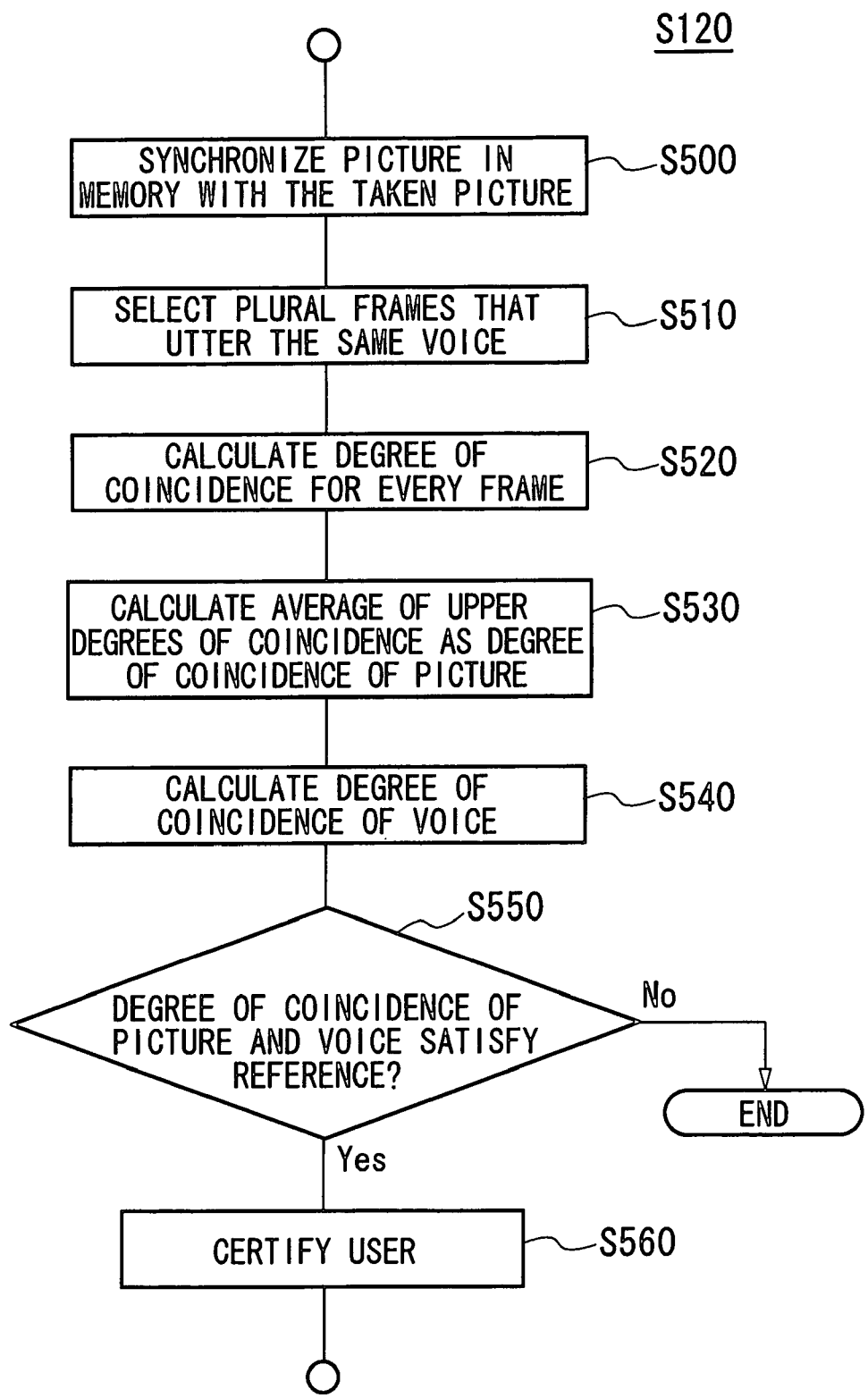
FIG. 7 is a flowchart showing the third transformation example of the process of S120 shown in FIG. 3.

FIG. 7 is a flowchart showing the third transformation example of the process of S120 shown in FIG. 3. The authentication unit 50 certifies the user based upon both of the degree of coincidence of the head shot and the degree of coincidence of the voice.

The synchronization unit 54 synchronizes the animated image taken by the image pickup unit 12 with the animated image acquired from the memory 30 based upon the user's voice at the time that the user utters the password (S500). This process is the same that of S200 shown in FIG. 3.

Then, the synchronization unit 54 selects the frame pictures corresponding to each other, that is, the frame pictures at the time that the same voices are uttered out of each of the two synchronized animated images (S510).

The face authentication unit 56 calculates the degree of coincidence between synchronizes the head shot taken by the image pickup unit 12 and the head shot acquired from the memory 30 for each of the selected frames (S520). Then, the face authentication unit 56 calculates the average of the upper degrees of coincidence among the calculated degrees of coincidence as the degree of coincidence for the head shot (S530). In addition, the authentication unit 50 calculates the degree of coincidence between the user's voice held in the memory 30 and the user's voice acquired by the microphone 14 (S540).

Then, when the degree of coincidence calculated by the face authentication unit 56 and the degree of coincidence for the voice satisfy a predetermined reference (S550: Yes), the authentication unit 50 certifies the user (S560). The predetermined reference means that a point defined by the degree of coincidence of the head shot and the degree of coincidence of the voice is in the range of the predetermined region in two-dimensional space defined by the degree of coincidence of the head shot and the degree of coincidence of the voice. The predetermined region is the region that satisfies, for example, the requirement that both of the degree of coincidence of the head shot and the degree of coincidence of the voice are more than the reference value.

According to the invention, the authentication apparatus 10 certifies the user based upon the degree of coincidence of the user's voice and the degree of coincidence of the frame picture synchronized by the voice. Therefore, the user can be certified with high precision.

As explained above, according to the present invention, the apparatus can match the user's face countenance during the authentication to the countenance of the user's head shot held in advance. Therefore, the user can be certified with high precision.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An authentication apparatus for certifying a user using a picture registered in a memory, comprising:
    an image pickup unit for taking the picture of the user; and
    an authentication unit for certifying the user by letting said user to bring into a predetermined action and comparing said user's picture taken by said image pickup unit when said user brings into the predetermined action and the picture registered in said memory,
    wherein said authentication unit certifies said user by respectively cutting a mouth of said user from the plurality of frame pictures, calculating and comparing the plurality of the differences of the cut user's mouth, and comparing a movement of the user's mouth in an animated image acquired from said memory and a movement of the user's mouth in the animated images taken by said image pickup unit, and
    wherein the authentication unit certifies a user by respectively cutting a mouth of the user from the plurality of frame pictures when he speaks a word.

2. The authentication apparatus as claimed in claim 1, wherein said image pickup unit takes the animated image of the user,
    said memory supplies the animated image of the user who brings into said predetermined action to said authentication unit,
    said authentication unit certifies said user by comparing a user's movement in the animated image taken by the image pickup unit and a user's movement in the animated image acquired from the memory.

3. The authentication apparatus as claimed in claim 2, wherein said image pickup unit takes an animated image of head shots of said user, said memory supplies the animated image of head shots of said user to said authentication unit, said authentication unit certifies said user by comparing a movement of the head shots taken by the image pickup unit and a movement of the head shots acquired from the memory.

4. The authentication apparatus as claimed in claim 1, further comprising a registration information acquiring unit for acquiring a voice of said user and the head shot of said user corresponding to said voice from said memory, wherein said image pickup unit takes the head shots of said user, and said authentication unit certifies said user by comparing the head shots of said user taken by the image pickup unit and the head shots acquired from the memory when a degree of coincidence between a voice newly uttered by said user and the voice acquired from said memory satisfies a predetermined reference.

5. The authentication apparatus as claimed in claim 4, wherein said memory holds an animated image of the head shots when said user has uttered said voice, said image pickup unit takes the head shots of said user as the animated image when said voice has been uttered, and said authentication unit certifies said user by comparing the animated image acquired from the memory and the animated image taken by the image pickup unit.

6. The authentication apparatus as claimed in claim 5, further comprising a microphone for newly acquiring the voice that said user utters, wherein said authentication unit certifies said user by respectively selecting frame pictures at the time that the user utters the same voice out of the animated image acquired from the memory and the animated image taken by the image pickup unit using the voice acquired from said memory and the voice acquired by said microphone, and comparing the selected frame pictures.

7. The authentication apparatus as claimed in claim 6, wherein said authentication unit certifies said user by selecting a plurality of combinations of the frame pictures at the time that the user utters the same voice out of the animated image acquired from the memory and the animated image taken by the image pickup unit, and comparing the selected plurality of combinations of the frame pictures respectively.

8. The authentication apparatus as claimed in claim 7, wherein said authentication unit includes a synchronization unit for synchronizing each frame picture of the animated image acquired from the memory with the respective frame pictures at the time that the user utters the same voice in the animated image taken by said image pickup unit using the voice acquired from said memory and the voice acquired by said microphone, and certifies said user by comparing the synchronized frame pictures.

9. The authentication apparatus as claimed in claim 5, wherein said authentication unit certifies said user by selecting a plurality of frame pictures at the time that the user utters the same voice out of each of the animated image acquired from the memory and the animated image taken by the image pickup unit, comparing a difference between the plurality of frame pictures selected out of the animated images acquired from said memory and a difference between the plurality of frame pictures selected out of the animated images taken by said image pickup unit, and comparing the movements of said user's face.

10. The authentication apparatus as claimed in claim 9, wherein said authentication unit certifies said user by respectively cutting a mouth of said user from the plurality of frame pictures, calculating and comparing the plurality of the differences of the cut user's mouth, and comparing a movement of the user's mouth in the animated image acquired from said memory and a movement of the user's mouth in the animated images taken by said image pickup unit.

11. The authentication apparatus as claimed in claim 4, wherein said memory stores head shots at the time that said user does not utter the voice, said image pickup unit takes the head shots at the time that said user does not utter the voice, and said authentication unit certifies said user by comparing the head shots acquired from said memory and the head shots taken by said image pickup unit at the time that said user does not utter the voice.

* * * * *